United States Patent
Yao et al.

(10) Patent No.: US 9,686,726 B2
(45) Date of Patent: Jun. 20, 2017

(54) METHOD AND DEVICE FOR MAKING DECISION ABOUT INTEROPERATION WITH WIRELESS LOCAL AREA NETWORK IN CELL HANDOVER OF TERMINAL

(71) Applicant: ZTE Corporation, Shenzhen (CN)

(72) Inventors: Jun Yao, Shenzhen (CN); Qian Dai, Shenzhen (CN); Yunpeng Cui, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/910,334

(22) PCT Filed: Apr. 29, 2014

(86) PCT No.: PCT/CN2014/076508
§ 371 (c)(1),
(2) Date: Mar. 8, 2016

(87) PCT Pub. No.: WO2014/169863
PCT Pub. Date: Oct. 23, 2014

(65) Prior Publication Data
US 2016/0219471 A1    Jul. 28, 2016

(30) Foreign Application Priority Data
Aug. 9, 2013    (CN) .......................... 2013 1 0349598

(51) Int. Cl.
*H04L 1/00*    (2006.01)
*H04W 36/00*    (2009.01)
(Continued)

(52) U.S. Cl.
CPC ... *H04W 36/0088* (2013.01); *H04W 36/0022* (2013.01); *H04W 36/14* (2013.01); *H04W 48/18* (2013.01); *H04W 36/08* (2013.01)

(58) Field of Classification Search
CPC .. H04B 7/2121; H04B 7/2123; H04B 7/2615; H04B 7/18541; H04J 2203/0069;
(Continued)

(56) References Cited

U.S. PATENT DOCUMENTS 8,457,636 B2    6/2013    Liu
2012/0108240 A1    5/2012    Liu
(Continued)

FOREIGN PATENT DOCUMENTS

CN    102369759 A    3/2012
CN    102917406 A    2/2013
(Continued)

OTHER PUBLICATIONS

Partial Supplementary European Search Report in European application No. 14785587.8, mailed on Jun. 24, 2016.
(Continued)

*Primary Examiner* — Dady Chery
(74) *Attorney, Agent, or Firm* — Oppedahl Patent Law Firm LLC

(57) ABSTRACT

A method and device for making a decision about interoperation with a Wireless Local Area Network (WLAN) during cell handover of a terminal are provided. The method includes that: if User Equipment (UE) determines that a condition of offloading to the WLAN is met according to a WLAN interoperation decision criterion configured by a network side, then offloading to the WLAN is delayed or cancelled; and if a reporting condition of a measurement report about offloading to the WLAN is met, then reporting of the measurement report about offloading to the WLAN is delayed or cancelled.

20 Claims, 4 Drawing Sheets

(51) Int. Cl.
*H04W 36/14* (2009.01)
*H04W 48/18* (2009.01)
*H04W 36/08* (2009.01)

(58) Field of Classification Search
CPC .... H04J 4/00; H04Q 2213/394; H04W 72/04; H04W 72/12; H04W 76/00; H04W 36/00; H04W 36/0005; H04W 36/0016; H04L 5/26; H04L 47/767; H04L 1/0002; H04L 1/20
USPC ........ 370/329, 330, 331, 332, 334; 455/450, 455/436
See application file for complete search history.

(56) References Cited

U.S. PATENT DOCUMENTS

| | | | |
|---|---|---|---|
| 2012/0263145 A1* | 10/2012 | Marinier | H04W 36/22 370/331 |
| 2012/0315905 A1 | 12/2012 | Zhu | |
| 2014/0036705 A1 | 2/2014 | Ma | |
| 2014/0082697 A1 | 3/2014 | Watfa et al. | |
| 2015/0043435 A1 | 2/2015 | Blankenship et al. | |
| 2015/0245262 A1 | 8/2015 | Marinier | |

FOREIGN PATENT DOCUMENTS

| | | |
|---|---|---|
| CN | 103024844 A | 4/2013 |
| JP | 2011254466 A | 12/2011 |
| JP | 2012523722 A | 10/2012 |
| JP | 2013522986 A | 6/2013 |
| JP | 2014512145 A | 5/2014 |
| WO | 2011159215 A1 | 12/2011 |
| WO | 2012142436 A1 | 10/2012 |
| WO | 2013042330 A1 | 3/2013 |
| WO | 2013050070 A1 | 4/2013 |
| WO | 2014043494 A1 | 3/2014 |
| WO | 2015021412 A1 | 2/2015 |

OTHER PUBLICATIONS

ZTE: "Optimization for Concurrent WLAN Offload/Anti-offload and 3Gpp HO Procedure",3GPP Draft; R2-141329 0ptimizati0n f0r Concurrent WLAN Offloadanti-Offload and 3GPP HO Procedure V2, 3rd Generation Partnership Pr0ject (3cpp), Mobile C0mpetence Centre ; 650, R0ute Des Luci0les; F-0,tyvol.RAN WG2,No. Valencia, Spain;20140331-2014040421. Mar. 2014 (Mar. 21, 2014), XPO50817474.
Supplementary European Search Report in European application No. 14785587.8, mailed on Oct. 11, 2016.
International Search Report in international application No. PCT/CN2014/076508, mailed on Jul. 23, 2014.
English Translation of the Written Opinion of the International Search Authority in international application No. PCT/CN2014/076508, mailed on Jul. 23, 2014.

* cited by examiner

METHOD AND DEVICE FOR MAKING DECISION ABOUT INTEROPERATION WITH WIRELESS LOCAL AREA NETWORK IN CELL HANDOVER OF TERMINAL

TECHNICAL FIELD

The disclosure relates to a handover technology, and in particular to a method and device for making a decision about interoperation with a Wireless Local Area Network (WLAN) in a cell handover process of a terminal.

BACKGROUND

Along with continued evolution of a wireless communication technology and standard, mobile packet services are greatly developed, and data throughput of single User Equipment (UE) is continuously improved. For example, a Long Term Evolution (LTE) system may support downlink data transmission at a maximum rate of 100 Mbps within a 20M bandwidth, and a data transmission rate of a subsequent LTE advanced system may further be increased, and may even reach 1 Gbps.

Explosive growth of data services of UE gradually tensions existing network resources particularly under the condition that network layout of a new-generation communication technology (such as 3rd-Generation (3G) and LTE) may not be widely implemented, which consequently causes incapability in meeting requirements of users on rate and traffic and poorer user experiences. How to prevent and change such a condition is a problem that an operating company must consider, and on one hand, it is necessary to accelerate popularization and network deployment of a new technology; and on the other hand, it is expected that an existing network and technology may be enhanced to fulfil the aim of rapidly improving network performance. As everyone knows, except a wireless network technology provided by the 3rd Generation Partnership Project (3GPP), a Wireless Local Area Network (WLAN) which has been widely applied at present, particularly an IEEE802.11-standard-based WLAN, has been widely applied to hotspot access coverage in homes, enterprises and even the Internet, wherein a technical specification proposed by the Wireless Fidelity (WIFI) Alliance is most widely applied, so that a WIFI network usually equals to the IEEE802.11-standard-based WLAN in practice, and under the condition of no confusions, a WIFI module is adopted to describe wireless transceiver and processing modules supporting WLAN in a network node hereinafter.

On such a premise, some operating companies and enterprises have proposed to merge a WLAN and an existing 3GPP access network to implement joint transmission and fulfil the aims of offloading the existing 3GPP access network and improving network performance by virtue of the WLAN. The 3GPP has formulated a related protocol for interworking between the 3GPP access network and the WLAN at present. As shown in FIG. 1, an interworking WLAN architecture of the 3GPP allows the WLAN to use an Authentication Authorization Accounting (AAA) server in the 3GPP access network for unified authentication and authorization, a packet data network gateway in the existing 3GPP access network may also be multiplexed as a packet data gateway of the WLAN, and in addition, unified accounting, charging and the like of the two networks may also be implemented to achieve loose coupling of the two networks.

However, a current interworking architecture also has some shortcomings, and for example, current interworking is triggered by UE, a 3GPP network side may not control a target access network, and although a network element Access Network Discovery Support Function (ANDSF) of a core network side may give some strategic rules, these rules are relatively static and the 3GPP network side loses control over access network selection of the UE, which may cause the problem that an access network selected by the UE may not meet a requirement of the UE on Quality of Service (QoS), or may cause frequent handover of the UE between the 3GPP access network and the WLAN to influence user experiences and simultaneously increase an unnecessary network load.

Therefore, it is necessary for the 3GPP access network to participate in network selection of the UE to control handover or offloading of the UE between the 3GPP access network and the WLAN partially or completely at present.

A conventional art has a problem as follows: in a scenario of a cell handover process of a terminal, when a WLAN is located in a range of a handover area of the terminal, as shown in FIG. 2, coverage of two 3GPP cells which are Cell 1 and Cell 2 is overlapped, the overlapped part is called the handover area, there is also a WLAN called WLAN 1 deployed by an operating company in this range, and then WLAN offloading in the handover process is likely to occur. However, offloading at this time may be unstable. For example, if the UE is being handed over from Cell 1 to Cell 2, the UE simultaneously offloads part of or all services to the WLAN according to a threshold or strategy provided by Cell 1, but Cell 2 may not support a function of handover or offloading between a 3GPP access network and the WLAN or Cell 2 supporting the function has a threshold or strategy different from that of Cell 1, an offloading preparation made by the UE may not work after the UE is successfully handed over to Cell 2 if the UE continues making the offloading preparation according to the threshold or strategy provided by Cell 1, which may cause waste of energy of the UE as well as resource waste.

SUMMARY

In view of this, the embodiments of the disclosure are intended to provide a method and device for making a decision about interoperation with a WLAN during cell handover of a terminal, so as to at least solve the problem of resource and energy waste probably caused by offloading between a 3GPP access network and the WLAN in a cell handover process of the terminal.

The technical solutions of the disclosure are implemented as follows.

A method for making a decision about interoperation with a WLAN during cell handover of a terminal is provided, which may include that:

UE triggers reporting of an access network measurement report because a handover condition is met;

when the UE determines that a condition of offloading to the WLAN is met according to a WLAN interoperation decision criterion configured by a network side, offloading to the WLAN is delayed or cancelled; and when a reporting condition of a measurement report about offloading to the WLAN is met, reporting of the measurement report about offloading to the WLAN is delayed or cancelled.

Here, the WLAN interoperation decision criterion may specifically be configured for the UE by an ANDSF, an Operation and Maintenance (O&M) background and a Radio Access Network (RAN).

Here, the method may further include that: after the UE triggers reporting of the access network measurement report because the handover condition is met, the UE starts a timer.

Here, a time length of the timer may be configured on a RAN side, or determined in the UE, or configured by the ANDSF, or configured by the O&M background.

Here, the method may further include that: during running of the timer and before timeout, when the UE retriggers reporting of the access network measurement report because the handover condition is met, the timer is restarted.

Here, the method may further include that: during running of the timer and before timeout, if the UE receives a handover command, the timer is stopped and reset.

Here, the method may further include that: during running of the timer, when the UE determines that the condition of offloading to the WLAN is met according to the WLAN interoperation decision criterion, the UE delays offloading to the WLAN till timeout of the timer.

Here, the method may further include that: during running of the timer, when the UE determines that the condition of offloading to the WLAN is met according to the WLAN interoperation decision criterion, the UE cancels offloading to the WLAN.

Here, the method may further include that: during running of the timer, when the reporting condition of the measurement report about offloading to the WLAN is met, the UE delays reporting of the measurement report about offloading to the WLAN till timeout of the timer.

Here, the method may further include that: during running of the timer, when the reporting condition of the measurement report about offloading to the WLAN is met, the UE cancels reporting of the measurement report about offloading to the WLAN.

A device for making a decision about interoperation with a WLAN during cell handover of a terminal is provided, which may be located on a terminal side, the device including:

a reporting unit, configured for UE to trigger reporting of an access network measurement report because a handover condition is met, or report a measurement report about offloading to the WLAN;

an offloading processing unit, configured to, when the UE determines that a condition of offloading to the WLAN is met according to a WLAN interoperation decision criterion configured by a network side, delay or cancel offloading to the WLAN; and a reporting processing unit, configured to, when a reporting condition of the measurement report about offloading to the WLAN is met, delay or cancel reporting of the measurement report about offloading to the WLAN.

Here, the device may further include:

a timing processing unit, configured to, after the UE triggers reporting of the access network measurement report because the handover condition is met, start a timer.

Here, the timing processing unit may further be configured to, during running of the timer and before timeout, when the UE retriggers reporting of the access network measurement report because the handover condition is met, restart the timer.

Here, the timing processing unit may further be configured to, during running of the timer and before timeout, when the UE receives a handover command, stop and reset the timer.

Here, the offloading processing unit may further be configured to, during running of the timer, when the UE determines that the condition of offloading to the WLAN is met according to the WLAN interoperation decision criterion, delay offloading to the WLAN till timeout of the timer.

Here, the offloading processing unit may further be configured to, during running of the timer, when the UE determines that the condition of offloading to the WLAN is met according to the WLAN interoperation decision criterion, cancel offloading to the WLAN.

Here, the reporting processing unit may further be configured to, during running of the timer, when the reporting condition of the measurement report about offloading to the WLAN is met, delay reporting of the measurement report about offloading to the WLAN till timeout of the timer.

Here, the reporting processing unit may further be configured to, during running of the timer, when the reporting condition of the measurement report about offloading to the WLAN is met, cancel reporting of the measurement report about offloading to the WLAN.

When the reporting unit, the offloading processing unit, the reporting processing unit and the timing processing unit, when executing processing, may be implemented by a Central Processing Unit (CPU), a Digital Signal Processor (DSP) or a Field-Programmable Gate Array (FPGA).

A method for making a decision about interoperation with a WLAN during cell handover of a terminal is provided, which may include that:

a source cell receives an access network measurement report reported by UE, and sends a handover request message or a relocation message; and the source cell receives a measurement report, reported by the UE, about offloading to the WLAN, and delays or cancels offloading to the WLAN.

Here, the step that the source cell receives the measurement report, reported by the UE, about offloading to the WLAN, and delays or cancels offloading to the WLAN may specifically include that:

when the source cell receives the measurement report about offloading to the WLAN from the UE, the source cell delays offloading to the WLAN until it is confirmed that there is no available target cell.

Here, the step that the source cell receives the measurement report, reported by the UE, about offloading to the WLAN, and delays or cancels offloading to the WLAN may specifically include that: when the source cell receives the measurement report about offloading to the WLAN from the UE, the source cell delays offloading to the WLAN until it is confirmed that there is an available target cell, and cancels offloading to the WLAN.

A device for making a decision about interoperation with a WLAN during cell handover of a terminal is provided, which may be located on a network side, the device including:

a receiving unit, configured to receive an access network measurement report reported by UE, and receive a measurement report, reported by the UE, about offloading to the WLAN;

a sending unit, configured to, when receiving the access network measurement report, send a handover request message or a relocation message; and an offloading processing unit, configured to, when receiving the measurement report, reported by the UE, about offloading to the WLAN, delay or cancel offloading to the WLAN.

Here, the offloading processing unit may further be configured to, when receiving the measurement report about offloading to the WLAN, delay offloading to the WLAN until it is confirmed that there is no available target cell.

Here, the offloading processing unit may further be configured to, when receiving the measurement report about offloading to the WLAN, delay offloading to the WLAN until it is confirmed that there is an available target cell, and cancel offloading to the WLAN.

The receiving unit, the sending unit and the offloading processing unit, when executing processing, may be implemented by a CPU, a DSP or an FPGA.

According to the embodiments of the disclosure, UE triggers reporting of an access network measurement report because a handover condition is met; if the UE determines that the condition of offloading to a WLAN is met according to a WLAN interoperation decision criterion configured by the network side, offloading to the WLAN is delayed or cancelled; and if the reporting condition of a measurement report about offloading to the WLAN is met, reporting of the measurement report about offloading to the WLAN is delayed or cancelled. By the embodiments of the disclosure, since the UE may judge whether to perform offloading to the WLAN or not according to the WLAN interoperation decision criterion configured by the network side so as to delay or cancel offloading to the WLAN, the problem of resource and energy waste probably caused by offloading between the 3GPP access network and the WLAN in the cell handover process of the terminal is at least solved.

DETAILED DESCRIPTION

Figure 1:
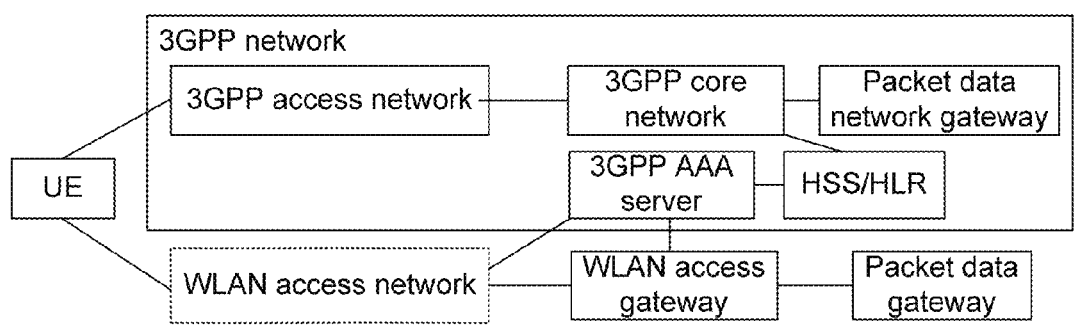
FIG. 1 is a schematic diagram of an existing interworking protocol architecture.
Figure 2:
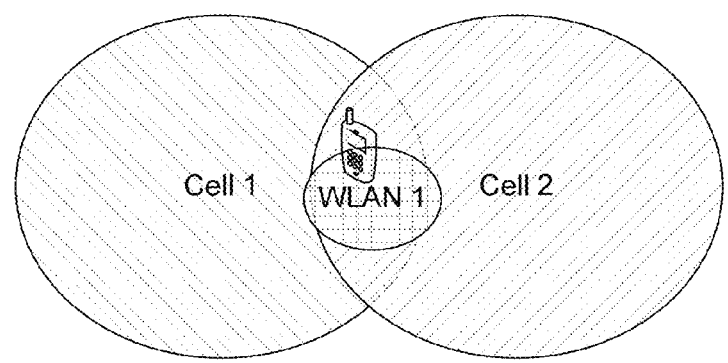
FIG. 2 is a schematic diagram of a scenario of offloading between a 3GPP access network and a WLAN in an existing handover process.

Implementation of the technical solutions will be further described below with reference to the drawings in detail.

For decision making of a terminal side, a method for making a decision about interoperation with a WLAN during cell handover of a terminal is provided, the method including that:

UE triggers reporting of an access network measurement report because a handover condition is met.

If the UE determines that a condition of offloading to the WLAN is met according to a WLAN interoperation decision criterion configured by a network side, offloading to the WLAN is delayed or cancelled.

The WLAN interoperation decision criterion configured by the network side may include that:

if a signal of the WLAN is higher than a signal threshold of the WLAN and/or a load of the WLAN is lower than a load threshold of the WLAN, then a service or bearer of a RAN may be offloaded to the WLAN, and if the signal of the WLAN is lower than the signal threshold of the WLAN and/or the load of the WLAN is higher than the load threshold of the WLAN, then a service or bearer of the WLAN may be offloaded to the RAN; or if a signal of the RAN is lower than a signal threshold of the RAN and/or a load of the RAN is higher than a load threshold of the RAN, then a service or bearer of the RAN may be offloaded to the WLAN, and if the signal of the RAN is higher than the signal threshold of the RAN and/or the load of the RAN is lower than the load threshold of the RAN, then a service or bearer of the WLAN may be offloaded to the RAN; or if the signal of the WLAN is higher than the signal threshold of the WLAN and/or the load of the WLAN is lower than the load threshold of the WLAN, and the signal of the RAN is lower than the signal threshold of the RAN and/or the load of the RAN is higher than the load threshold of the RAN, then the service or bearer of the RAN may be offloaded to the WLAN; and if the signal of the WLAN is lower than the signal threshold of the WLAN and/or the load of the WLAN is higher than the load threshold of the WLAN, and the signal of the RAN is higher than the signal threshold of the RAN and/or the load of the RAN is lower than the load threshold of the RAN, then the service or bearer of the WLAN may be offloaded to the RAN.

Different RAN thresholds and WLAN thresholds are configured by the network side.

If a reporting condition of a measurement report about offloading to the WLAN is met, reporting of the measurement report about offloading to the WLAN is delayed or cancelled.

The reporting condition of the measurement report about offloading to the WLAN may specifically include that:

if signal quality or signal strength of the WLAN is higher than a certain threshold and/or the load of the WLAN is lower than a certain threshold, then reporting of the measurement report about offloading to the WLAN is triggered; or if signal quality of signal strength of the RAN is lower than a certain threshold and/or the load of the RAN is higher than a certain threshold, then reporting of the measurement report about offloading to the WLAN is triggered; or if the signal quality or signal strength of the RAN is lower than a certain threshold and/or the load of the RAN is higher than a certain threshold, and the signal quality or signal strength of the WLAN is higher than a certain threshold, then reporting of the measurement report about offloading to the WLAN is triggered; or if the signal quality or signal strength of the RAN is lower than a certain threshold and/or the load of the RAN is higher than a certain threshold, the signal quality or signal strength of the WLAN is higher than a certain threshold and the load of the WLAN is lower than a certain threshold, then reporting of the measurement report about offloading to the WLAN is triggered.

Preferably, the WLAN interoperation decision criterion is specifically configured for the UE by an ANDSF, an O&M background and the RAN.

Preferably, the method further includes that: after the UE triggers reporting of the access network measurement report because the handover condition is met, the UE starts a timer.

Preferably, a time length of the timer is configured on a RAN side, or determined in the UE, or configured by the ANDSF, or configured by the O&M background.

Preferably, the method further includes that: during running of the timer and before timeout, if the UE retriggers reporting of the access network measurement report because the handover condition is met, then the timer is restarted.

Preferably, the method further includes that: during running of the timer and before timeout, if the UE receives a handover command, the timer is stopped and reset.

Preferably, the method further includes that: during running of the timer, if the UE determines that the condition of offloading to the WLAN is met according to the WLAN interoperation decision criterion, the UE delays offloading to the WLAN till timeout of the timer.

Preferably, the method further includes that: during running of the timer, if the UE determines that the condition of offloading to the WLAN is met according to the WLAN interoperation decision criterion, then the UE cancels offloading to the WLAN.

Preferably, the method further includes that: during running of the timer, if the reporting condition of the measurement report about offloading to the WLAN is met, then the UE delays reporting of the measurement report about offloading to the WLAN till timeout of the timer.

Preferably, the method further includes that: during running of the timer, if the reporting condition of the measurement report about offloading to the WLAN is met, then the UE cancels reporting of the measurement report about offloading to the WLAN.

For decision making of a terminal side, a device for making a decision about interoperation with a WLAN during cell handover of a terminal is provided, which is located on the terminal side, the device including:

a reporting unit, configured for UE to trigger reporting of an access network measurement report because a handover condition is met, or report a measurement report about offloading to the WLAN;

an offloading processing unit, configured to, when the UE determines that a condition of offloading to the WLAN is met according to a WLAN interoperation decision criterion configured by a network side, delay or cancel offloading to the WLAN; and a reporting processing unit, configured to, when a reporting condition of the measurement report about offloading to the WLAN is met, delay or cancel reporting of the measurement report about offloading to the WLAN.

Preferably, the device further includes:

a timing processing unit, configured to, after the UE triggers reporting of the access network measurement report because the handover condition is met, start a timer.

Preferably, the timing processing unit is configured to, during running of the timer and before timeout, if the UE retriggers reporting of the access network measurement report because the handover condition is met, restart the timer.

Preferably, the timing processing unit is configured to, during running of the timer and before timeout, if the UE receives a handover command, stop and reset the timer.

Preferably, the offloading processing unit is configured to, during running of the timer, if the UE determines that the condition of offloading to the WLAN is met according to the WLAN interoperation decision criterion, delay offloading to the WLAN till timeout of the timer.

Preferably, the offloading processing unit is configured to, during running of the timer, if the UE determines that the condition of offloading to the WLAN is met according to the WLAN interoperation decision criterion, cancel offloading to the WLAN.

Preferably, the reporting processing unit is configured to, during running of the timer, when the reporting condition of the measurement report about offloading to the WLAN is met, delay reporting of the measurement report about offloading to the WLAN till timeout of the timer.

Preferably, the reporting processing unit is further configured to, during running of the timer, if the reporting condition of the measurement report about offloading to the WLAN is met, cancel reporting of the measurement report about offloading to the WLAN.

A user terminal, particularly a mobile terminal such as a mobile phone, includes the device on the terminal side, and each unit in the device may be, not limited to, independently arranged or combined in a hardware entity with a processing function such as a processor, a controller, a microprocessor or a microcontroller of the mobile phone.

For decision making of a network side, a method for making a decision about interoperation with a WLAN during cell handover of a terminal is provided, which includes that:

a source cell receives an access network measurement report reported by UE, and sends a handover request message or a relocation message; and the source cell receives a measurement report, reported by the UE, about offloading to the WLAN, and delays or cancels offloading to the WLAN.

Preferably, the step that the source cell receives the measurement report, reported by the UE, about offloading to the WLAN, and delays or cancels offloading to the WLAN specifically includes that: if the source cell receives the measurement report about offloading to the WLAN from the UE, then the source cell delays offloading to the WLAN until it is confirmed that there is no available target cell.

Preferably, the step that the source cell receives the measurement report, reported by the UE, about offloading to the WLAN, and delays or cancels offloading to the WLAN specifically includes that: if the source cell receives the measurement report about offloading to the WLAN from the UE, then the source cell delays offloading to the WLAN until it is confirmed that there is an available target cell, and cancels offloading to the WLAN.

For decision making of a network side, a device for making a decision about interoperation with a WLAN during cell handover of a terminal is provided, which is located on a network side, the device including:

a receiving unit, configured to receive an access network measurement report reported by UE, and receive a measurement report, reported by the UE, about offloading to the WLAN;

a sending unit, configured to, when receiving the access network measurement report, send a handover request message or a relocation message; and an offloading processing unit, configured to, when receiving the measurement report, reported by the UE, about offloading to the WLAN, delay or cancel offloading to the WLAN.

Preferably, the offloading processing unit is configured to, when receiving the measurement report about offloading to the WLAN, delay offloading to the WLAN until it is confirmed that there is no available target cell.

Preferably, the offloading processing unit is configured to, when receiving the measurement report about offloading to the WLAN, delay offloading to the WLAN until it is confirmed that there is an available target cell, and cancel offloading to the WLAN.

A Node B or a Radio Network Controller (RNC) includes the device on the network side, and each unit in the device may be, not limited to, independently arranged or combined in a hardware entity with a processing function such as a processor, a controller, a microprocessor or a microcontroller of the Node B or the RNC.

The embodiments of the disclosure are elaborated below with examples.

The method includes that: UE triggers a 3GPP access network measurement report because a handover condition is met, or a source cell sends a handover request message or a relocation message;

when the UE determines that a condition of offloading to a WLAN is met according to a WLAN interoperation decision criterion, or the source cell receives a measurement report about offloading to the WLAN, offloading to the WLAN is delayed or cancelled;

or, when a reporting condition of the measurement report about offloading to the WLAN is met, sending of the measurement report is delayed or cancelled.

The WLAN interoperation decision criterion may be configured for the UE by an ANDSF, an O&M background and a RAN.

Specifically, after the UE triggers the 3GPP access network measurement report because the handover condition is met, the UE starts a timer.

A time length of the timer is configured on a RAN side or determined in the UE or configured by the ANDSF or configured by the O&M background.

Specifically, during running of the timer and before timeout, if the UE retriggers the 3GPP access network measurement report because the handover condition is met, the timer is restarted.

Specifically, during running of the timer and before timeout, if the UE receives a handover command, the timer is stopped and reset.

Specifically, during running of the timer, if the UE determines that the condition of offloading to the WLAN is met according to the WLAN interoperation decision criterion, the UE delays offloading to the WLAN till timeout of the timer.

Specifically, during running of the timer, when the UE determines that the reporting condition of the measurement report about offloading to the WLAN is met according to the WLAN interoperation decision criterion, the UE delays sending of the measurement report till timeout of the timer.

Preferably, the source cell sends the handover request message or the relocation message, and then, if the source cell receives the measurement report about offloading to the WLAN from the UE, the source cell delays offloading to the WLAN until it is confirmed that there is no available target cell.

Preferably, the source cell sends the handover request message or the relocation message, and then, if the source cell receives the measurement report about offloading to the WLAN from the UE, the source cell delays offloading to the WLAN until it is confirmed that there is an available target cell, and cancels offloading to the WLAN.

First Embodiment

Figure 3:
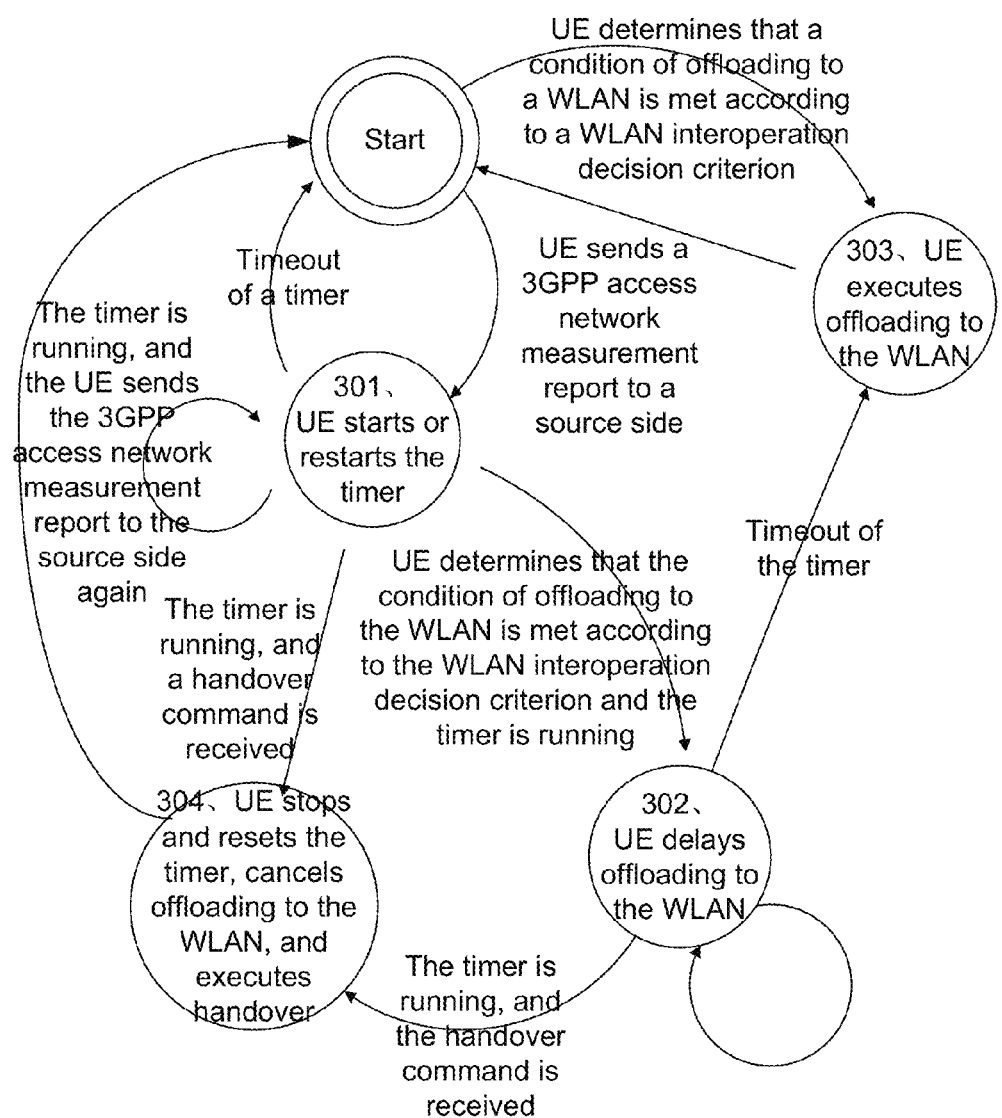
FIG. 3 is a diagram of state transition of a terminal according to a first embodiment of the disclosure.

FIG. 3 is a diagram of state transition of a terminal according to a first embodiment of the disclosure, wherein 301 to 304 are four states of UE, and texts above the arrows are state transition conditions.

The terminal is initially in a starting state, and at this time, the terminal is in a state of monitoring a 3GPP access network and a WLAN. When a condition of sending a 3GPP access network measurement report to a source side is met, the terminal is transited to state 301, that is, the UE starts or restarts a timer.

Here, in an LTE system, there are totally three types of measurement reporting of a Radio Resource Control (RRC) layer: event triggered reporting, event triggered periodic reporting and periodic reporting. There are eight triggering events for measurement reporting, wherein a RAN is likely to be triggered by events A2, A3, A4, A5, B1 and B2 to switch the UE to another cell. In a Universal Mobile Telecommunication System (UMTS), there are also three triggering manners similar to those of the LTE system for measurement reporting of an RRC layer: event triggered reporting, event triggered periodic reporting and periodic reporting. But there are more types of triggering events for measurement reporting in the UMTS, wherein handover of the terminal is more likely to be triggered by events of series 1, series 2 and series 3.

When the UE sends an event triggered report or event triggered periodic report triggered by the abovementioned measurement events to the source side, the UE starts the timer. A time length of the timer is configured on a RAN side or determined in the UE or configured by an ANDSF or configured by an O&M background.

A network side usually configures multiple measurement report triggering events to the UE, and multiple measurement reports may also be configured for the same triggering event. Moreover, event triggered periodic reporting may also trigger reporting of measurement reports for multiple times; and if the event triggered report or event triggered periodic report triggered by the abovementioned measurement events is retriggered after the UE has started the timer and when the timer is running, the UE restarts the timer, and state 301 is automatically transited.

In case of timeout of the timer in state 301, state 301 is transited to the starting state.

If the UE determines that a condition of offloading to the WLAN is met according to a WLAN interoperation decision criterion and the timer is running in state 301, state 301 is transited to state 302, and the UE delays offloading to the WLAN. If the condition of offloading is met again and the timer is running in state 302, state 302 is automatically transited, and offloading to the WLAN is delayed again.

Here, the WLAN interoperation decision criterion may be configured to the UE by the ANDSF, the O&M background and the RAN.

The WLAN interoperation decision criterion may include that:

if a signal of the WLAN is higher than a signal threshold of the WLAN and/or a load of the WLAN is lower than a load threshold of the WLAN, then a service or bearer of the RAN may be offloaded to the WLAN, and if the signal of the WLAN is lower than the signal threshold of the WLAN and/or the load of the WLAN is higher than the load threshold of the WLAN, then a service or bearer of the WLAN may be offloaded to the RAN; or if a signal of the RAN is lower than a signal threshold of the RAN and/or a load of the RAN is higher than a load threshold of the RAN, then a service or bearer of the RAN may be offloaded to the WLAN, and if the signal of the RAN is higher than the signal threshold of the RAN and/or the load of the RAN is lower than the load threshold of the RAN, then the service or bearer of the WLAN may be offloaded to the RAN; or if the signal of the WLAN is higher than the signal threshold of the WLAN and/or the load of the WLAN is lower than the load threshold of the WLAN, and if the signal of the RAN is lower than the signal threshold of the RAN and/or the load of the RAN is higher than the load threshold of the RAN, then the service or bearer of the RAN may be offloaded to the WLAN; and if the signal of the WLAN is lower than the signal threshold of the WLAN and/or the load of the WLAN is higher than the load threshold of the WLAN, and if the signal of the RAN is higher than the signal threshold of the RAN and/or the load of the RAN is lower than the load threshold of the RAN, then the service or bearer of the WLAN may be offloaded to the RAN.

Different RAN thresholds and WLAN thresholds are configured by the network side.

In case of timeout of the timer in state 302, state 302 is transited to state 303, the UE executes offloading to the WLAN, and the terminal determines a service or an Internet Protocol (IP) stream or a Public Data Network (PDN) connection needed to be offloaded to the WLAN, notifies a core network, modifies or deletes the bearer, establishes an association with the WLAN, establishes a connection with an Evolved Packet Core (EPC) through the WLAN, and performs data transmission of the corresponding service or IP stream or PDN connection. After the data transmission is ended, state 303 is automatically transited to the starting state, and the UE enters the state of monitoring the 3GPP access network and the WLAN again.

If the timer does not run in the starting state and the UE determines that the condition of offloading to the WLAN is met according to the WLAN interoperation decision criterion, then the starting state is transited to state 303, that is, the UE executes offloading to the WLAN.

When the timer is running in state 301 or state 302 and a handover command sent by the access network is received, state 301 or state 302 is transited to state 304, and the UE stops and resets the timer, cancels offloading to the WLAN, and executes handover. After handover is ended, state 304 is automatically transited to the starting state, and the UE enters the state of monitoring the 3GPP access network and the WLAN again.

It is to be noted here that the diagram of state transition of the terminal in the embodiment is applicable to operation of delaying reporting of a measurement report about offloading to the WLAN by the UE after a certain state transition condition and state are modified. The state transition condition of transition from the starting state to state 303 is modified into that a reporting condition of the measurement report about offloading to the WLAN is met; state 303 is modified into that the UE executes reporting of the measurement report about offloading to the WLAN; the state transition condition of transition from state 301 to state 302 is modified into that the reporting condition of the measurement report about offloading to the WLAN is met and the timer is running; state 302 is modified into that the UE delays reporting of the measurement report about offloading to the WLAN, and the state transition condition of automatic transition from state 302 to state 302 is modified into that the reporting condition of the measurement report about offloading to the WLAN is met and the timer is running; and state 304 is modified into that the UE stops and resets the timer, cancels reporting of the measurement report about offloading to the WLAN and executes handover.

Here, the reporting condition of the measurement report about offloading to the WLAN may specifically include that:

when signal quality or signal strength of the WLAN is higher than a certain threshold and/or the load of the WLAN is lower than a certain threshold, reporting of the measurement report about offloading to the WLAN is triggered; or when signal quality of signal strength of the RAN is lower than a certain threshold and/or the load of the RAN is higher than a certain threshold, reporting of the measurement report about offloading to the WLAN is triggered; or when the signal quality or signal strength of the RAN is lower than a certain threshold and/or the load of the RAN is higher than a certain threshold, and the signal quality or signal strength of the WLAN is higher than a certain threshold, reporting of the measurement report about offloading to the WLAN is triggered; or when the signal quality or signal strength of the RAN is lower than a certain threshold and/or the load of the RAN is higher than a certain threshold, the signal quality or signal strength of the WLAN is higher than a certain threshold and the load of the WLAN is lower than a certain threshold, reporting of the measurement report about offloading to the WLAN is triggered.

Second Embodiment

Figure 4:
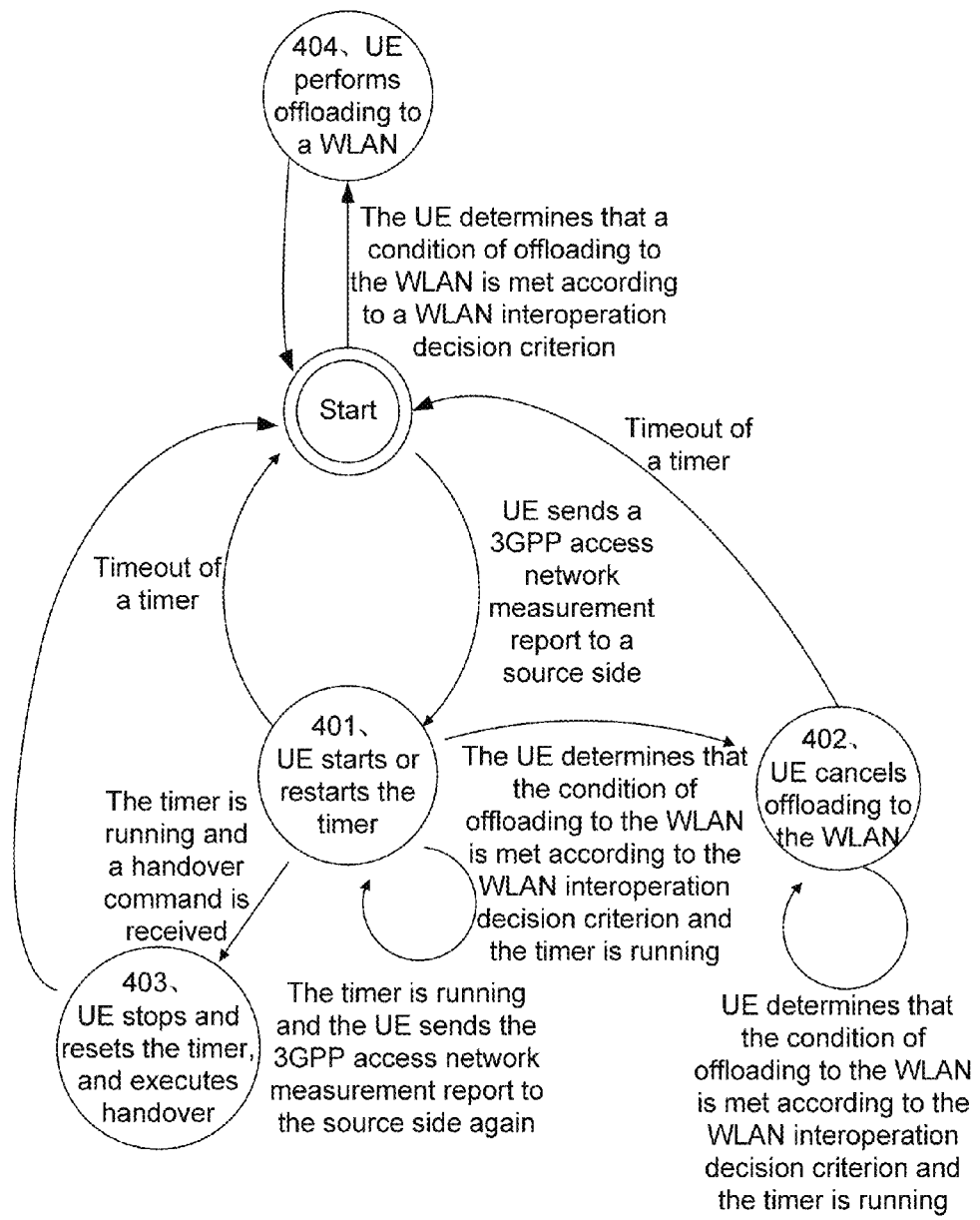
FIG. 4 is a diagram of state transition of a terminal according to a second embodiment of the disclosure.

FIG. 4 is a diagram of state transition of a terminal according to a second embodiment of the disclosure, wherein 401 to 404 are four states of UE, and texts above the arrows are state transition conditions.

The terminal is initially in a starting state, and at this time, the terminal is in a state of monitoring a 3GPP access network and a WLAN. When a condition of sending a 3GPP access network measurement report to a source side is met, the terminal is transited to state 401, that is, the UE starts or restarts a timer.

Here, in an LTE system, there are totally three types of measurement reporting of an RRC layer: event triggered reporting, event triggered periodic reporting and periodic reporting. There are eight triggering events for measurement reporting, wherein a RAN is likely to be triggered by events A2, A3, A4, A5, B1 and B2 to switch the UE to another cell. In a UMTS, there are also three triggering manners similar to those of the LTE system for measurement reporting of an RRC layer: event triggered reporting, event triggered periodic reporting and periodic reporting. But there are more types of triggering events for measurement reporting in the UMTS, wherein handover of the terminal is more likely to be triggered by events of series 1, series 2 and series 3.

When the UE sends an event triggered report or event triggered periodic report triggered by the abovementioned measurement events to the source side, the UE starts the timer. A time length of the timer is configured on a RAN side or determined in the UE or configured by an ANDSF or configured by an O&M background.

A network side usually configures multiple measurement report triggering events to the UE, and multiple measurement reports may also be configured for the same triggering event. Moreover, event triggered periodic reporting may also trigger multiple reporting of measurement reports, and when the event triggered report or event triggered periodic report triggered by the abovementioned measurement events is retriggered after the UE has started the timer and when the timer is running, the UE restarts the timer, and state 401 is automatically transited.

When the UE determines that a condition of offloading to the WLAN is met according to a WLAN interoperation decision criterion and the timer is running in state 401, state 401 is transited to state 402, and the UE cancels offloading to the WLAN, that is, the UE continues performing data transmission according to an existing connection, wherein the WLAN interoperation decision criterion may be configured for the UE by the ANDSF, the O&M background and the RAN. When the UE determines that the condition of offloading to the WLAN is met again according to the WLAN interoperation decision criterion and the timer is running after the UE has cancelled offloading to the WLAN, state 402 is automatically transited.

Here, the WLAN interoperation decision criterion may be configured to the UE by the ANDSF, the O&M background and the RAN.

The WLAN interoperation decision criterion may include that:

if a signal of the WLAN is higher than a signal threshold of the WLAN and/or a load of the WLAN is lower than a load threshold of the WLAN, a service or bearer of the RAN may be offloaded to the WLAN, and if the signal of the WLAN is lower than the signal threshold of the WLAN and/or the load of the WLAN is higher than the load threshold of the WLAN, then a service or bearer of the WLAN may be offloaded to the RAN; or if a signal of the RAN is lower than a signal threshold of the RAN and/or a load of the RAN is higher than a load threshold of the RAN, the service or bearer of the RAN may be offloaded to the WLAN, and if the signal of the RAN is higher than the signal threshold of the RAN and/or the load of the RAN is lower than the load threshold of the RAN, then a service or bearer of the WLAN may be offloaded to the RAN; or if the signal of the WLAN is higher than the signal threshold of the WLAN and/or the load of the WLAN is lower than the load threshold of the WLAN, and the signal of the RAN is lower than the signal threshold of the RAN and/or the load of the RAN is higher than the load threshold of the RAN, then the service or bearer of the RAN may be offloaded to the WLAN, and if the signal of the WLAN is lower than the signal threshold of the WLAN and/or the load of the WLAN is higher than the load threshold of the WLAN, and the signal of the RAN is higher than the signal threshold of the RAN and/or the load of the RAN is lower than the load threshold of the RAN, then the service or bearer of the WLAN may be offloaded to the RAN.

If the timer is running and the UE receives a handover command, then the UE is transited from state 401 to state 403, and the UE stops and resets the timer, executes handover, and is automatically transited to the starting state after executing handover.

In case of timeout of the timer in state 401 or state 402 of the UE, the UE is transited into the starting state.

If the UE determines that the condition of offloading to the WLAN is met according to the WLAN interoperation decision criterion in the starting state, then the UE is transited into state 404, the UE performs offloading to the WLAN, and after executing corresponding operation of offloading, the UE is automatically transited to the starting state.

It is to be noted here that the diagram of state transition of the terminal in the embodiment is applicable to operation of cancelling reporting of a measurement report about offloading to the WLAN by the UE after a certain state transition condition and state are modified. The state transition condition of transition from the starting state to state 404 is modified into that a reporting condition of the measurement report about offloading to the WLAN is met; state 404 is modified into that the UE executes reporting of the measurement report about offloading to the WLAN; the state transition condition of transition from state 401 to state 402 is modified into that the reporting condition of the measurement report about offloading to the WLAN is met and the timer is running; state 402 is modified into that the UE cancels reporting of the measurement report about offloading to the WLAN; the state transition condition of automatic transition from state 402 to state 402 is modified into that the reporting condition of the measurement report about offloading to the WLAN is met and the timer is running; and state 403 is modified into that the UE stops and resets the timer and executes handover.

Here, the reporting condition of the measurement report about offloading to the WLAN may specifically include that:

when signal quality or signal strength of the WLAN is higher than a certain threshold and/or the load of the WLAN is lower than a certain threshold, reporting of the measurement report about offloading to the WLAN is triggered; or when signal quality of signal strength of the RAN is lower than a certain threshold and/or the load of the RAN is higher than a certain threshold, reporting of the measurement report about offloading to the WLAN is triggered; or when the signal quality or signal strength of the RAN is lower than a certain threshold and/or the load of the RAN is higher than a certain threshold, and the signal quality or signal strength of the WLAN is higher than a certain threshold, reporting of the measurement report about offloading to the WLAN is triggered; or when the signal quality or signal strength of the RAN is lower than a certain threshold and/or the load of the RAN is higher than a certain threshold, the signal quality or signal strength of the WLAN is higher than a certain threshold and the load of the WLAN is lower than a certain threshold, reporting of the measurement report about offloading to the WLAN is triggered.

Third Embodiment

Figure 5:
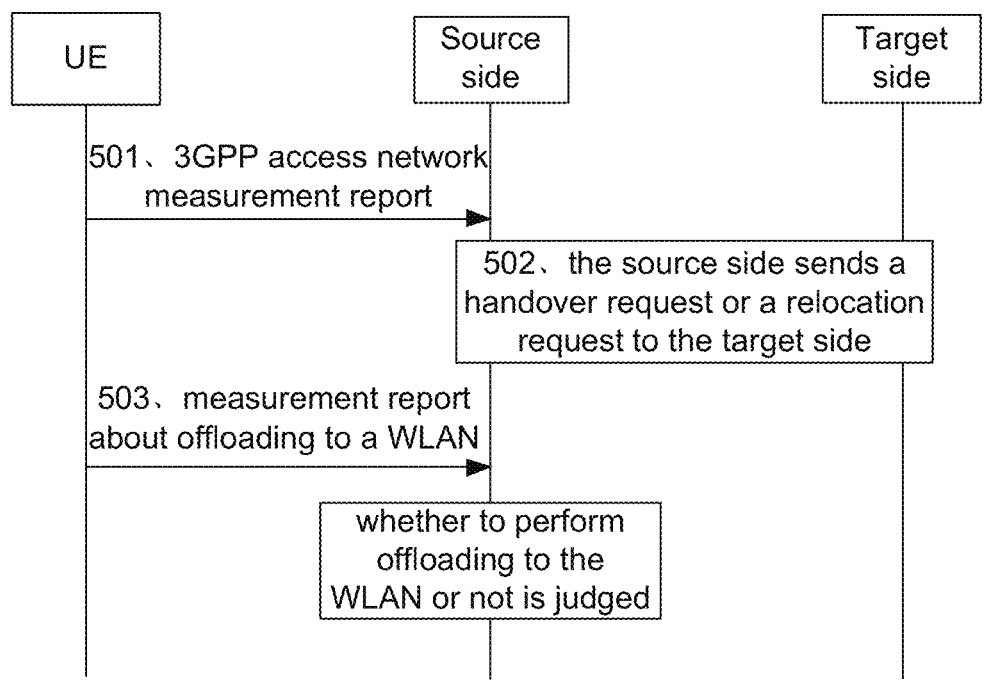
FIG. 5 is an implementation flowchart of a third embodiment of the disclosure.

FIG. 5 is a flowchart of a third embodiment of the disclosure. Description will be given below with reference to the flowchart, and the flow includes the following steps:

Step 501: UE sends a 3GPP access network measurement report to a source side.

In the conventional art, a RAN side may configure some measurements for the UE, including intra-frequency measurement, inter-frequency measurement and inter-RAT measurement, and monitors a condition of a current wireless environment, and if a neighbouring cell is monitored to be more suitable than a serving cell for providing service for the UE, then the source side may configure handover for the UE. A measurement report is an important basis for the RAN side to judge whether to hand over the UE or not.

In the step, the measurement report may be an event triggered report, may also be a periodic report, and is a measurement report supported by an existing network of a 3GPP system. If the RAN side is an Evolved Universal Terrestrial Radio Access Network (EUTRAN), then the source side and/or a target side refer/refers to (an) Evolved Node B (eNB), and if the RAN side is a UMTS Terrestrial Radio Access Network (UTRAN), the source side and/or the target side refer/refers to (an) RNC.

Step 502: the source side sends a handover request or a relocation request to the target side.

When the source side receives the measurement report from the UE and considers that the UE should execute handover at this time, the source side may look for a proper target cell for the UE, and the source side may send a handover request message or a relocation request message to the target side.

Step 503: the UE sends a measurement report about offloading to a WLAN to the source side.

Step 504: the source side receives the measurement report about offloading to the WLAN.

The measurement report about offloading to the WLAN is event-triggered, and for example, signal strength and/or quality of one or more WLANs are/is currently higher than a certain threshold and/or (a) load(s) of one or more WLANs is/are currently lower than a certain threshold, and/or strength and/or quality of a current serving cell are/is lower than a certain threshold and/or a load of the current serving cell is higher than a certain threshold.

Step 505: the source side judges whether to perform offloading to the WLAN or not.

If the measurement report about offloading to the WLAN is received before a reply to the handover request or relocation request sent by the source side is not received from the target side, then the source side may delay offloading to the WLAN; the source side cancels offloading to the WLAN if a proper handover cell is found after receiving the reply from the target side, and performs offloading to the WLAN if no proper serving cell is found.

If the reply to the handover request or relocation request sent by the source side has been received from the target side and the proper serving cell is found, then offloading to the WLAN is cancelled.

If the reply to the handover request or relocation request sent by the source side has been received from the target side but no proper serving cell is found, then offloading to the WLAN is executed.

When the source side decides to perform offloading to the WLAN, the source side sends an offloading command to the UE to notify the UE that offloading to the WLAN is allowed or tell the UE about a bearer to be transferred to a WLAN connection, and/or the source side notifies a core network side of the bearer to be transferred to the WLAN connection, and modifies or deletes the corresponding bearer.

The integrated modules in the embodiments of the disclosure may also be stored in a computer-readable storage medium if being implemented in form of software function modules and sold or used as independent products. Based on such understanding, the technical solutions of the embodiments of the disclosure or the parts contributing to the conventional art may be embodied in form of software product, and the computer software product is stored in a storage medium, and includes a plurality of instructions to enable a piece of computer equipment (which may be a personal computer, a server, network equipment or the like) to execute all or part of the method of each embodiment of the disclosure. The storage medium includes: various media capable of storing program codes, such as a U disk, a mobile hard disk, a Read-Only Memory (ROM), a Random Access Memory (RAM), a disk or a compact disc. Therefore, the embodiments of the disclosure are not limited to any specific hardware and software combination.

Correspondingly, the embodiments of the disclosure further provide a computer storage medium, in which a computer program is stored, the computer program being configured to execute a method for making a decision about interoperation with a WLAN during cell handover of a terminal in the embodiments of the disclosure.

The above are only the preferred embodiments of the disclosure and not intended to limit the scope of protection of the disclosure.

INDUSTRIAL APPLICABILITY

According to the embodiments of the disclosure, UE triggers reporting of an access network measurement report because the handover condition is met; if the UE determines that the condition of offloading to the WLAN is met according to a WLAN interoperation decision criterion configured by a network side, then offloading to the WLAN is delayed or cancelled; and if the reporting condition of the measurement report about offloading to the WLAN is met, then reporting of the measurement report about offloading to the WLAN is delayed or cancelled. By the embodiments of the disclosure, since the UE may judge whether to perform offloading to the WLAN or not according to the WLAN interoperation decision criterion configured by the network side so as to delay or cancel offloading to the WLAN, the problem of resource and energy waste probably caused by offloading between the 3GPP access network and the WLAN in the cell handover process of the terminal is at least solved.

What is claimed is:

1. A method for making a decision about interoperation with a Wireless Local Area Network (WLAN) during cell handover of a terminal, wherein the WLAN is located in a range of a overlapped part between a source cell and a target cell of User Equipment (UE), comprising:

triggering, by the UE, reporting of an access network measurement report because a handover condition is met;

when the UE determines that a condition of offloading part of or all services of the UE to the WLAN is met according to a WLAN interoperation decision criterion configured by a network side, delaying or cancelling offloading part of or all services of the UE to the WLAN; and when a reporting condition of a measurement report about offloading part of or all services of the UE to the WLAN is met, delaying or cancelling reporting of the measurement report about offloading part of or all services of the UE to the WLAN.

2. The method according to claim 1, wherein the WLAN interoperation decision criterion is specifically configured for the UE by an Access Network Discovery Support Function (ANDSF), an Operation and Maintenance (O&M) background and a Radio Access Network (RAN).

3. The method according to claim 1, further comprising: after triggering, by the UE, reporting of the access network measurement report because the handover condition is met, starting, by the UE, a timer.

4. The method according to claim 3, wherein a time length of the timer is configured on a RAN side, or determined in the UE, or configured by an ANDSF, or configured by an O&M background.

5. The method according to claim 3, further comprising: during running of the timer and before timeout, when the UE retriggers reporting of the access network measurement report because the handover condition is met, restarting the timer.

6. The method according to claim 3, further comprising: during running of the timer and before timeout, when the UE receives a handover command, stopping and resetting the timer.

7. The method according to claim 3, further comprising: during running of the timer, when the UE determines that the condition of offloading part of or all services of the UE to the WLAN is met according to the WLAN interoperation decision criterion, delaying, by the UE, offloading part of or all services of the UE to the WLAN till timeout of the timer.

8. The method according to claim 3, further comprising: during running of the timer, when the UE determines that the condition of offloading part of or all services of the UE to the WLAN is met according to the WLAN interoperation decision criterion, cancelling, by the UE, offloading part of or all services of the UE to the WLAN.

9. The method according to claim 3, further comprising: during running of the timer, when the reporting condition of the measurement report about offloading part of or all services of the UE to the WLAN is met, delaying, by the UE, reporting of the measurement report about offloading part of or all services of the UE to the WLAN till timeout of the timer.

10. The method according to claim 3, further comprising: during running of the timer, when the reporting condition of the measurement report about offloading part of or all services of the UE to the WLAN is met, cancelling, by the UE, reporting of the measurement report about offloading part of or all services of the UE to the WLAN.

11. A device for making a decision about interoperation with a Wireless Local Area Network (WLAN) during cell handover of a terminal, which is located on a terminal side, wherein the WLAN is located in a range of a overlapped part between a source cell and a target cell of User Equipment (UE); the device comprising:
a reporting unit, configured for the UE to trigger reporting of an access network measurement report because a handover condition is met, or report a measurement report about offloading part of or all services of the UE to the WLAN;
an offloading processing unit, configured to, when the UE determines that a condition of offloading part of or all services of the UE to the WLAN is met according to a WLAN interoperation decision criterion configured by a network side, delay or cancel offloading part of or all services of the UE to the WLAN; and
a reporting processing unit, configured to, when a reporting condition of the measurement report about offloading part of or all services of the UE to the WLAN is met, delay or cancel reporting of the measurement report about offloading part of or all services of the UE to the WLAN.

12. The device according to claim 11, further comprising:
a timing processing unit, configured to, after the UE triggers reporting of the access network measurement report because the handover condition is met, start a timer;
wherein the timing processing unit is further configured to, during running of the timer and before timeout, when the UE retriggers reporting of the access network measurement report because the handover condition is met, restart the timer; or the timing processing unit is further configured to, during running of the timer and before timeout, when the UE receives a handover command, stop and reset the timer.

13. The device according to claim 11, wherein the offloading processing unit is further configured to, during running of the timer, when the UE determines that the condition of offloading part of or all services of the UE to the WLAN is met according to the WLAN interoperation decision criterion, delay offloading part of or all services of the UE to the WLAN till timeout of the timer; or,
the offloading processing unit is further configured to, during running of the timer, when the UE determines that the condition of offloading part of or all services of the UE to the WLAN is met according to the WLAN interoperation decision criterion, cancel offloading part of or all services of the UE to the WLAN.

14. The device according to claim 11, wherein the reporting processing unit is further configured to, during running of the timer, when the reporting condition of the measurement report about offloading part of or all services of the UE to the WLAN is met, delay reporting of the measurement report about offloading part of or all services of the UE to the WLAN till timeout of the timer;
the reporting processing unit is further configured to, during running of the timer, when the reporting condition of the measurement report about offloading part of or all services of the UE to the WLAN is met, cancel reporting of the measurement report about offloading part of or all services of the UE to the WLAN.

15. A method for making a decision about interoperation with a Wireless Local Area Network (WLAN) during cell handover of a terminal, wherein the WLAN is located in a range of a overlapped part between a source cell and a target cell of User Equipment (UE), comprising:
receiving, by the source cell, an access network measurement report reported by the UE, and sending a handover request message or a relocation message; and
receiving, by the source cell, a measurement report, reported by the UE, about offloading part of or all services of the UE to the WLAN, and delaying or cancelling offloading part of or all services of the UE to the WLAN.

16. The method according to claim 15, wherein receiving, by the source cell, the measurement report, reported by the UE, about offloading part of or all services of the UE to the WLAN, and delaying or cancelling offloading part of or all services of the UE to the WLAN specifically comprises:
when the source cell receives the measurement report about offloading part of or all services of the UE to the WLAN from the UE, delaying, by the source cell, offloading part of or all services of the UE to the WLAN until it is confirmed that there is no available target cell.

17. The method according to claim 15, wherein receiving, by the source cell, the measurement report, reported by the UE, about offloading part of or all services of the UE to the WLAN, and delaying or cancelling offloading part of or all services of the UE to the WLAN specifically comprises:
when the source cell receives the measurement report about offloading part of or all services of the UE to the WLAN from the UE, delaying, by the source cell, offloading part of or all services of the UE to the WLAN until it is confirmed that there is an available target cell, and cancelling offloading part of or all services of the UE to the WLAN.

18. A device for making a decision about interoperation with a Wireless Local Area Network (WLAN) during cell handover of a terminal, which is located on a network side, the device comprising:
a receiving unit, configured to receive an access network measurement report reported by User Equipment (UE), and receive a measurement report, reported by the UE, about offloading part of or all services of the UE to the WLAN;
a sending unit, configured to, when receiving the access network measurement report, send a handover request message or a relocation message; and
an offloading processing unit, configured to, when receiving the measurement report, reported by the UE, about offloading part of or all services of the UE to the WLAN, delay or cancel offloading part of or all services of the UE to the WLAN.

19. The device according to claim 18, wherein the offloading processing unit is further configured to, when receiving the measurement report about offloading part of or all services of the UE to the WLAN, delay offloading part of or all services of the UE to the WLAN until it is confirmed that there is no available target cell.

20. The device according to claim 18, wherein the offloading processing unit is further configured to, when receiving the measurement report about offloading part of or all services of the UE to the WLAN, delay offloading part of or all services of the UE to the WLAN until it is confirmed that there is an available target cell, and cancel offloading part of or all services of the UE to the WLAN.

* * * * *